US006994205B2

(12) United States Patent
Grochowski

(10) Patent No.: US 6,994,205 B2
(45) Date of Patent: Feb. 7, 2006

(54) APPARATUS FOR CONTROLLING THE DEPOSITION OF FEED MATERIAL ON A DEPOSITION BUILD-UP SURFACE

(75) Inventor: Michael Joseph Grochowski, Mountain Top, PA (US)

(73) Assignee: ALSTOM Technology Ltd, Baden (CH)

( * ) Notice: Subject to any disclaimer, the term of this patent is extended or adjusted under 35 U.S.C. 154(b) by 0 days.

(21) Appl. No.: 10/828,092

(22) Filed: Apr. 20, 2004

(65) Prior Publication Data

US 2005/0230224 A1 Oct. 20, 2005

(51) Int. Cl.
*B65G 45/00* (2006.01)

(52) U.S. Cl. ............... 198/495; 198/550.3; 198/550.01

(58) Field of Classification Search ................ 198/495, 198/493, 468.11, 550.5, 550.3, 550.01, 550.6, 198/562

See application file for complete search history.

(56) References Cited

U.S. PATENT DOCUMENTS 3,057,454 A * 10/1962 Frasch et al. ............... 198/535
3,802,554 A * 4/1974 Paulsen et al. ............. 198/494
3,815,728 A * 6/1974 Vaughan ..................... 198/495
4,061,221 A * 12/1977 Higashinaka et al. ....... 198/524
4,287,979 A * 9/1981 Molins et al. ........... 198/418.2
4,439,211 A * 3/1984 Anderson et al. .......... 134/25.1
4,522,295 A * 6/1985 Seragnoli .................... 198/493
4,860,883 A * 8/1989 Knaul et al. ................ 198/495
4,993,538 A * 2/1991 Norbury ..................... 198/495
5,073,342 A * 12/1991 Porte et al. ................... 422/64
5,318,165 A * 6/1994 Spatafora et al. ........... 198/433
5,355,992 A * 10/1994 Baig et al. .................. 198/495
5,372,242 A * 12/1994 McInnes et al. ............ 198/495
5,372,243 A * 12/1994 King .......................... 198/495
5,447,221 A * 9/1995 Winski .................. 198/468.11
5,524,746 A * 6/1996 Massen et al. .............. 198/443
5,542,525 A * 8/1996 Kornely ...................... 198/495
5,706,931 A * 1/1998 Gori et al. .................. 198/493
6,035,996 A * 3/2000 Swift ......................... 198/495
6,050,392 A * 4/2000 Straub ........................ 198/495
6,058,556 A * 5/2000 Jones .......................... 15/302
6,206,175 B1 * 3/2001 Tschantz ..................... 198/493
6,327,966 B1 * 12/2001 Bergmeier ................... 99/327
6,401,910 B1 * 6/2002 Pellini ........................ 198/495
6,651,803 B2 * 11/2003 Virippil et al. ............. 198/495
6,695,122 B2 * 2/2004 Enomoto .................... 198/495
6,752,858 B1 * 6/2004 Flynn et al. .................. 95/271

* cited by examiner

*Primary Examiner*—Gene O. Crawford
*Assistant Examiner*—Rashmi Sharma
(74) *Attorney, Agent, or Firm*—Arthur E. Fournier, Jr.

(57) ABSTRACT

An apparatus 40 for controlling the deposition of feed material, such as coal 24, on a deposition build-up surface 64 subjected to deposition loading of feed material is provided for use in a feeder arrangement having an endless conveyor 42 for conveying feed material to the rotating blades 46 of a distribution rotor 44 for further conveyance of the feed material. The deposition control apparatus 40 controls the deposition on the deposition build-up surface 64 of feed material that has exited the endless conveyor 42 yet has not been conveyed beyond the distribution rotor 44. The deposition control apparatus 40 includes a device for influencing the movement of feed material relative to the deposition build-up surface 64 such that the deposition of feed material on the deposition build-up surface 64 is hindered.

4 Claims, 3 Drawing Sheets

APPARATUS FOR CONTROLLING THE DEPOSITION OF FEED MATERIAL ON A DEPOSITION BUILD-UP SURFACE

BACKGROUND OF THE INVENTION

The invention relates to an apparatus for controlling the deposition of feed material on a deposition build-up surface of a feed arrangement for feeding feed material from an in-process feed material source to a material handling location.

Stokers are mechanical devices that feed and burn solid fuels in a bed at the bottom of a furnace. The solid fuel is burned on some form of grate, through which passes some or all of the air for combustion. The grate surface in the stationary or moving. Feeder devices continuously project metered amounts of solid fuel into the furnace above an ignited fuel bed on the grate. Fines are burned in suspension while larger particles fall and burn on the grate.

A particular type of coal feeder device for feeding metered amounts of coal from a coal silo onto a stoker includes an underthrow coal distributor having a spaced chain that conveys substantially uniform increments of the coal fed thereto from the coal silo. The spaced chain drops off the coal to fall in between respective pairs of the rotating blades of a distribution rotor and the distribution rotor further conveys the coal to the stoker, which may be, say, a traveling grate stoker.

It has become a common design practice, in connection with this type of coal feeder device, to provide a so-called siftings tray shortly below the lower run of the spaced chain of the underthrow coal distributor and extending to the upstream edge of a cowling partially encircling the distribution rotor. Such siftings trays are subjected to a deposition build-up of coal particles thereon in connection with which an excessive build up of such coal particles interferes with the operation of the spaced chain of the underthrow coal distributor.

While one approach to the deposition build-up of coal particles has been to merely permit such a build-up of the coal particles, whereupon space constraints the inherent instability of the accumulation of the coal particles will eventually limit further deposition build-up of coal particles, the need still exists for an approach that can more reliably ensure the desired operation of the underthrow coal distributor. Such an approach should preferably be inexpensive to manufacture and should be capable of using a power source that is readily available in a typical process plant, in order to keep installation costs to a minimum. Also, the approach should be suitable for use in the relatively harsh environment of the coal feed operation including being subjected to temperature gradients and vibration. The system also should be simple and reliable, in order to keep maintenance costs to a minimum.

Accordingly, it is an object of the present invention to provide an apparatus that addresses the concerns set forth above.

SUMMARY OF THE INVENTION

According to the present invention, an apparatus for controlling the deposition of feed material on a deposition build-up surface is provided that advantageously influences the movement of feed material relative to the deposition build-up surface such that the deposition of feed material on the deposition build-up surface is hindered.

According to one aspect of the present invention, the apparatus is configured for use in a feeder arrangement having an endless conveyor for conveying feed material to the rotating blades of a distribution rotor for further conveyance of the feed material, whereby the inventive apparatus controls the deposition of feed material on a deposition build-up surface subjected to deposition loading of feed material that has exited the endless conveyor yet has not been conveyed beyond the distribution rotor. The particular type of feeder arrangement for which the inventive apparatus is suitable is the type of feeder arrangement wherein the endless conveyor moves in a loop having a respective clockwise-denominated handedness with some portion of the endless conveyor always traveling along an upper run while another portion of the endless conveyor travels along a lower run below the upper run with the endless conveyor, as it travels along its upper run, conveying feed material to a drop-off location at which conveyed feed material drops off the endless conveyor for receipt thereof by the rotating blades of the distribution rotor, wherein the rotation of such distributor rotor blades in an opposite clockwise-denominated handedness relative to the endless conveyor causes a portion of the feed material to move towards the deposition build-up surface and thereby disadvantageously promote a deposition build up on the surface.

According to further details of the one aspect of the present invention, the apparatus includes means for influencing the movement of feed material relative to the deposition build-up surface such that the deposition of feed material on the deposition build-up surface is hindered.

According to a variation of the one aspect of the present invention, the means for influencing the movement of feed material relative to the deposition build-up surface includes means for directing a fluid relative to the feed material.

According to another variation of the one aspect of the present invention, the means for influencing the movement of feed material relative to the deposition build-up surface includes a mechanical device for displacing feed material.

DETAILED DESCRIPTIONS OF THE PREFERRED EMBODIMENTS

Figure 1:
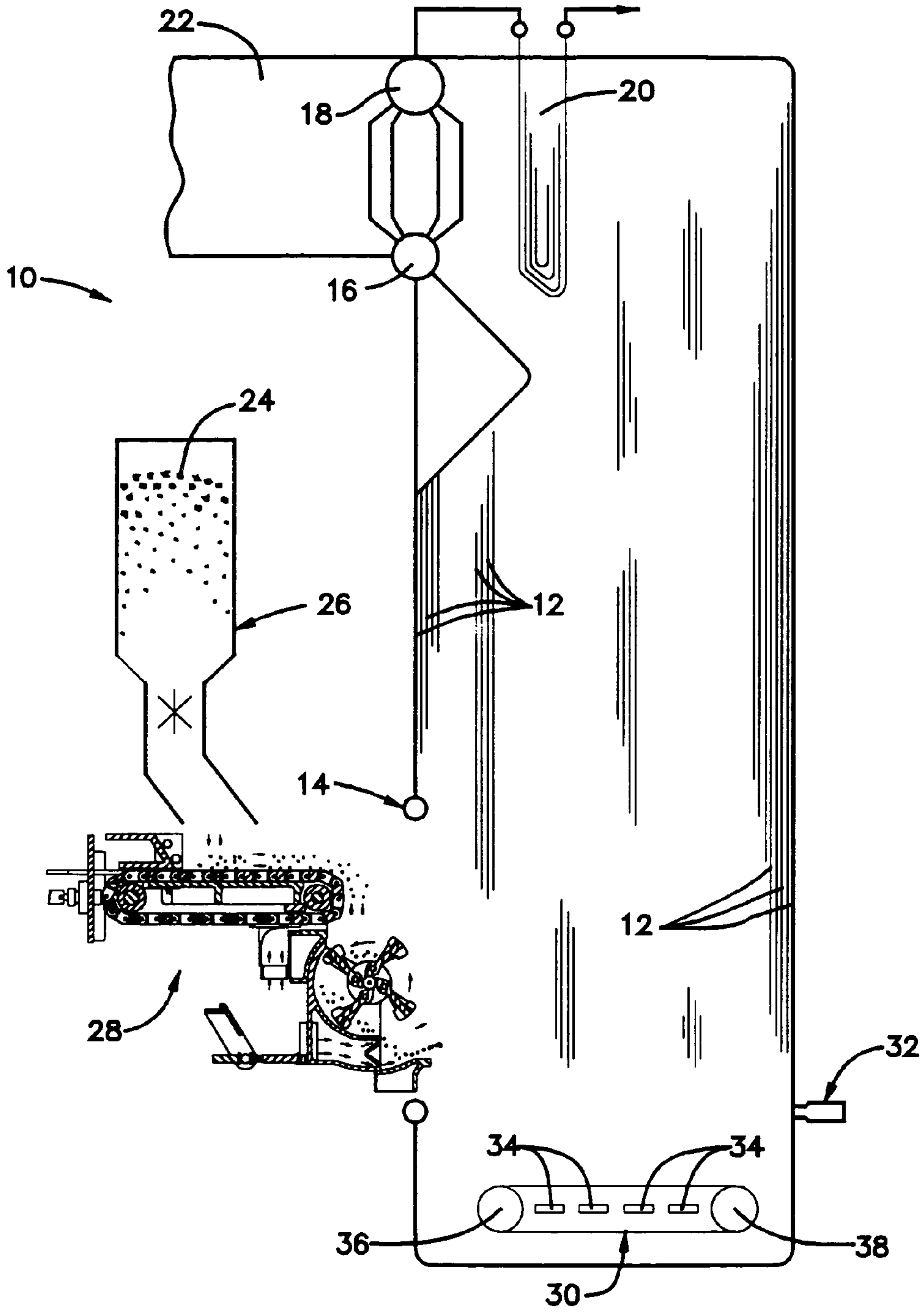
FIG. 1 is a schematic sectional elevational view of a fossil fuel combustion chamber comprising an underthrow coal distributor that distributes coal to a traveling grate stoker for combustion of the coal thereon in the combustion chamber, wherein the underthrow coal distributor includes one embodiment of the deposition control apparatus of the present invention.

Reference is now had to FIG. 1, which is a schematic sectional elevational view of a fossil fuel combustion chamber 10 operable in conventional manner to combust a fossil fuel such as, for example, coal. The combustion chamber 10 comprises an enclosure whose walls are formed by tubes 12 communicated with headers 14. The headers receive water from a lower drum 16 through downcomers (not shown). A mixture of steam and water exits from the upper ends of tubes 12 into an upper drum 18. Flue gas generated in the combustion chamber 10 passes in heat exchange contact with conventional heat exchange surfaces such as, for example, a superheater 20 as it flows to and along a backpass 22.

Referring now more particularly to the fossil fuel delivery arrangement of the combustion chamber 10, coal 24 which may have been optionally subjected to an appropriate particle size reduction treatment such as, for example, grinding thereof by a pulverizer (not shown), is stored in a coal silo 26 and is fed therefrom in a metered manner onto an underthrow coal distributor 28. The underthrow coal distributor 28 spreads or throws out the coal 24 onto a traveling grate stoker 30 that, in turns, supports the coal 24 as the traveling grate stoker 30 travels along its upper run at the lower portion of the combustion chamber 10. The coal 24 is thus combusted as it is supported on the traveling grate stoker 30 while overfire air is supplied through a plurality of nozzles 32 and underfire air is supplied beneath the traveling grate stoker 30 via a plurality of underfire air inlets 34.

The traveling grate stoker 30 is comprised of a continuous "chain" of interconnected laterally elongated bar and key assemblies trained around a stoker idler sprocket 36 and an stoker drive sprocket 38. The traveling grate stoker 30 is driven in a clockwise direction under the driving action of the stoker drive sprocket 38.

Figure 2:
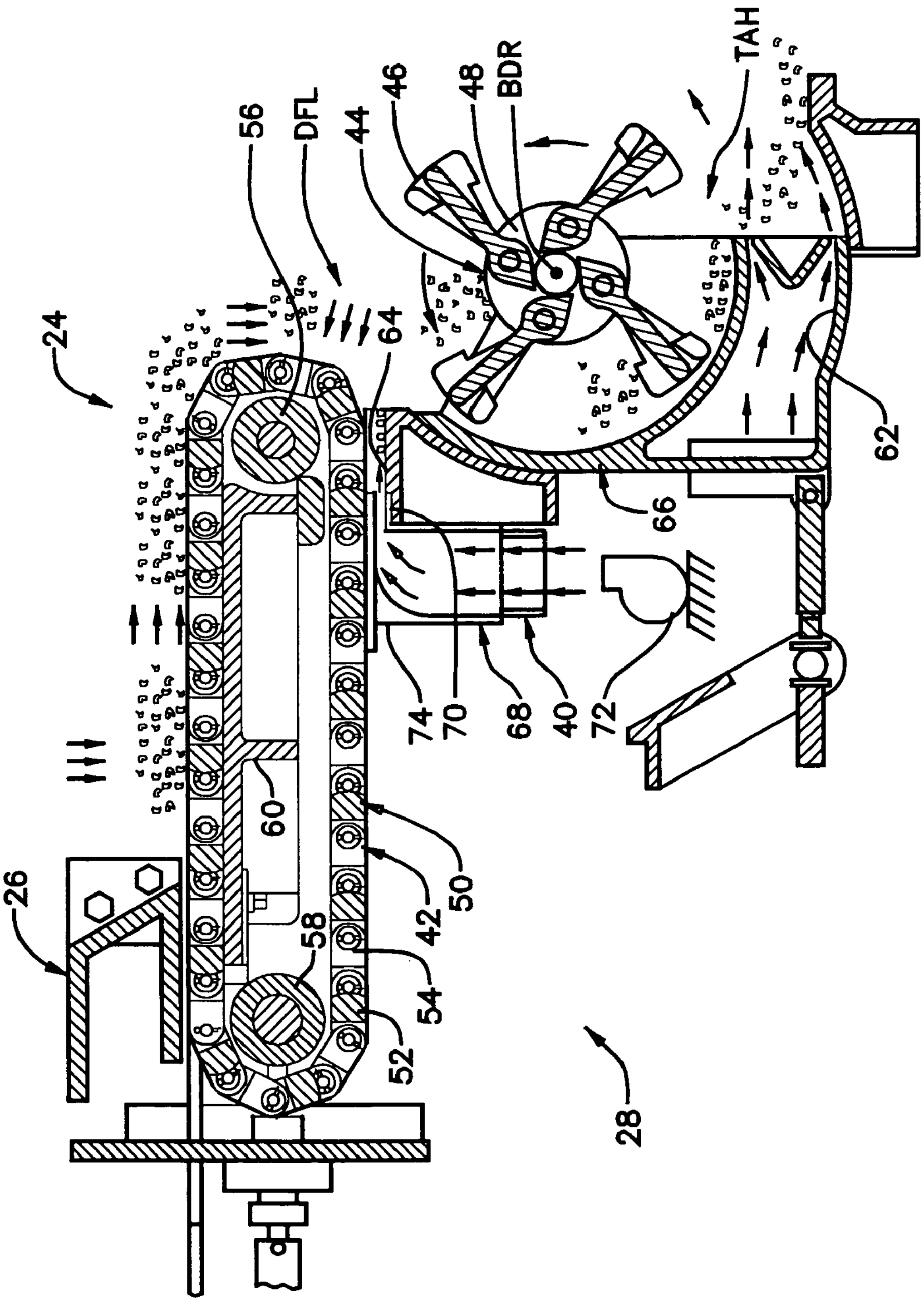
FIG. 2 is an enlarged sectional elevational view of the underthrow coal distributor shown in FIG. 1 having the one embodiment of the deposition control apparatus of the present invention.

Reference is now had to FIG. 2, which is an enlarged sectional elevational view of the underthrow coal distributor 28 shown in FIG. 1 having the one embodiment of the deposition control apparatus of the present invention. The underthrow coal distributor 28 is exemplary of the type of feeder arrangement whose operation can be optimized by the inventive apparatus for controlling the deposition of feed material on a deposition build-up surface, this inventive deposition control apparatus being hereinafter designated as the deposition control apparatus 40. The underthrow coal distributor 28 includes an endless conveyor 42 for conveying feed material in the form of the coal 24 and a distribution rotor 44 having a plurality of rotating blades 46 secured at uniform angular spacings around a hub 48 and extending radially from the hub 48. The endless conveyor 42, whose configuration and operation will be described in more detail shortly, conveys the coal 24 deposited thereonto from the coal silo 26 to a drop off location DFL at which the coal 24 falls from the endless conveyor 42 onto the distribution rotor 44.

The hub 48 of the distribution rotor 44 is operatively connected to a conventional rotor drive motor (not shown) that rotates the hub 48, and the blades 46 connected thereto, in a counter-clockwise direction about a distribution rotor axis BDR. The rotating blades 46 of the distribution rotor 44 further convey the coal 24 delivered to the distribution rotor 44 by the endless conveyor 42 to the traveling grate stoker 30.

The endless conveyor 42 is comprised of a spaced chain 50 itself formed of a plurality of feeding bars 52 secured together by a plurality of links 54 in an endless loop. Each feeding bar 52 is spaced from adjacent feeding bars 52 such that the respective spaces thus formed between respective adjacent pairs of the feeding bars 52 can receive and convey coal 24. The spaced chain 50 moves in a loop having a respective clockwise-denominated handedness; with regard to the one embodiment of the deposition control apparatus 40 illustrated in FIG. 1 and FIG. 2, this respective clockwise-denominated handedness is a clockwise handedness.

The spaced chain 50 is trained around a conveyor drive sprocket 56 and a conveyor idler sprocket 58, each of which has an axis of rotation parallel to the distribution rotor axis BDR, whereupon the spaced chain 50 continuously or endlessly travels successively along an upper run extending from the conveyor idler sprocket 58 to the conveyor drive sprocket 56 and a lower run extending from the conveyor drive sprocket 56 to the conveyor idler sprocket 58. Also, a support plate 60 supports the spaced chain 50 along its upper run such that some portion of the spaced chain 50 is always traveling along the upper run while another portion of the spaced chain 50 travels along the lower run below the upper run.

The endless conveyor 42, as it travels along its upper run, thus conveys the coal 24 to the drop-off location DFL at which conveyed coal 24 drops off the endless conveyor 42 for receipt thereof by the rotating blades 46 of the distribution rotor 44. Specifically, the coal 24 falls from the endless conveyor 42 at the drop off location DFL into the gaps between angularly adjacent pairs of the rotating blades 46 of the distribution rotor 44 and the distribution rotor 44 then carries the coal 24 in a counter-clockwise rotational path from approximately the top dead center of the rotational path of the distribution rotor 44 to a throw out location TAH at which the conveyed coal 24 is "spread" or thrown out onto the traveling grate stoker 30. The throw out location TAH is located at approximately two hundred and seventy degrees (270°) from the top dead center of the rotational path of the distribution rotor 44 as measured in the counter-clockwise direction. The "spreading" or throwing out of the coal 24 by the distribution rotor 44 is further assisted by a stream of high pressure air introduced at the throw out location TAH by a high pressure air outlet 62; this stream of high pressure air promotes the transport of the relatively more fine particles of the coal 24 away from the deposition control apparatus 40 and toward the traveling grate stoker 30.

The rotating blades 46 of the distribution rotor 44 rotate in a respective clockwise-denominated handedness that is opposite to that of the endless conveyor 42—for example, with respect to the arrangement shown in FIG. 1 and FIG. 2, the rotating blades 46 of the distribution rotor 44 rotate in a counter-clockwise direction while the endless conveyor 42 rotates in a clockwise direction. These oppositely handed directions of movement of the distribution rotor 44 and the endless conveyor 42 cause a portion of the coal 24 that has exited the endless conveyor 42 yet has not been conveyed beyond the distribution rotor 44 to move towards a deposition build-up surface. The deposition build-up surface, which is to be understood in connection with the present invention as a surface subjected to deposition loading of a feed material, is the respective surface, hereinafter designated as the deposition build-up surface 64, whose location relative to the endless conveyor 42 and the distribution rotor 44 is such that the surface will, unless such a deposition build up is prevented or resisted, experience a build up of coal thereon comprised of a portion of the coal 24 that has exited the endless conveyor 42 yet has not been conveyed beyond the distribution rotor 44.

It can be seen in FIG. 2 that the deposition build-up surface 64 is the surface located immediately below the beginning of the lower run of the spaced chain 50; due to a combination of deposition build-up events, there would otherwise be a deposition build up of coal particles on the deposition build-up surface 64 if the just-described coal feeding operation were to be operated without the deposition control apparatus 40. These deposition build-up events may take various forms depending upon the respective individual feed operation and it is to be understood in connection with the present invention that the "deposition build-up" on a surface is intended to be interpreted as the presence of feed material on a surface which interferes with, or in some manner influences, the feed operation in a manner and/or to an extent that makes it desirable to reduce, eliminate, or prevent such feed material presence on the respective surface. Moreover, the concept of the "deposition build-up" on a surface is intended to comprehend all such manifestations of a "deposition build-up" on a surface including a building up of feed material on a surface wherein the quantity of feed material increases at a continuous or intermittent rate, a building up of feed material on a surface wherein the quantity of feed material alternately increases and decreases at a cyclic rate or at a non-uniform rate, a building up of feed material on a surface wherein the building up of feed material occurs as a result of the addition of freshly added feed material onto feed material that has already been built up on the surface, and a building up of feed material on a surface wherein the building up of feed material occurs as a result of the substitution of more recently deposited feed material in lieu of other feed material that had been deposited and has now departed the surface.

With respect to the events that lead to the "deposition build-up" on a surface, the concept of the "deposition build-up" on a surface is intended to comprehend all manner and type of mechanisms that result in the disposition of feed material on a respective surface, wherein such mechanisms may include one or all of the following: (a) the release of any coal 24 in the spaces between the feeding bars 52 of the spaced chain 50 that has been retained in the spaced chain 50 as the spaced chain 50 travels around and beyond the conveyor drive sprocket 56, (b) the effect of centrifugal force generated by either the movement of the endless conveyor 42 or the distribution rotor 44 on the coal 24, (c) the effects of collisions between particles of the coal 24 falling into the gaps between the blades 46 of the distribution rotor 44 and the blades themselves, (d) the air sweeping force exerted by the movement of the spaced chain 50 between its upper and lower runs or by the rotational movement of the distribution rotor 44, (e) the surface adhesion forces of the surface on the coal 24, or (f) the surface adhesion forces of particles of the coal 24 already deposited on the surface on other particles of the coal 24. Moreover, the concept of "deposition" with respect to the "deposition build-up" on a surface is intended to comprehend, in addition to the disposition of particles of the coal 24 directly or immediately on the surface itself, the disposition of particles of the coal 24 not directly onto the surface itself but, instead, the disposition of such particles of the coal 24 onto other particles of the coal 24 which themselves are directly or immediately on the surface itself or are disposed on still other particles of the coal 24 which themselves are directly or immediately on the surface itself.

It may be considered that one approach to avoiding deposition build-up is to configure the respective feed arrangement such that no surfaces are presented that would detrimentally promote the deposition of feed material thereon including, especially, no such surfaces in the region of the drop off location DFL. However, the underthrow coal distributor 28 is specifically configured to feed the coal 24 at a uniform feed rate onto the traveling grate stoker 30 for the reason that an operation of the underthrow coal distributor 28 in this manner permits reliable control of the respective output—i.e., steam rate, electrical power generation, etc.—of the combustion chamber 10 and/or any power generation equipment to which the combustion chamber 10 is coupled. For this reason, it can be understood that it is desirable, in many circumstances, to orient the endless conveyor 42 such that the upper run of the spaced chain 50 is as nearly horizontal as possible, whereupon the operation of the spaced chain 50 can be optimally coordinated with the metered dosage of the coal 24 from the coal silo 26 onto the spaced chain 50 such that a substantially uniform increment of the coal 24 is conveyed between each adjacent pair of the feeding bars 52 of the spaced chain 50. An inclined upper run of the spaced chain 50 may lead to spillage of coal between adjacent pairs of the feeding bars 52 of the spaced chain 50, thereby raising the risk of the conveyance of the coal 24 by the spaced chain 50 in non-uniform increments. Additionally, it can be seen that a cowling 66 having a curvature configured with respect to the distribution rotor 44 is mounted relative to the distribution rotor 44 to facilitate the capture and retention of the coal 24 by the distribution rotor 44 and this cowling 66 has an upstream edge (viewed relative to the direction of rotation of the distribution rotor 44) that is positioned to ensure that a portion of the coal 24 that has immediately before entered into a gap between a respective pair of the blades 46 of the distribution rotor 44 remains within the gap as the gap travels toward the throw out location TAH. It has thus become, in connection with the types of coal feed arrangements to which the underthrow coal distributor 28 belongs, a common design practice to provide a so-called siftings tray shortly below the lower run of the spaced chain of the underthrow coal distributor and extending to the upstream edge of the cowling of the distribution rotor. Such siftings trays are subjected to a deposition build-up of coal particles thereon in connection with which an excessive build up of such coal particles interferes with the operation of the spaced chain.

In accordance with the present invention, the deposition control apparatus 40 is provided to hinder at least partially and, preferably, to hinder completely, the deposition build up of coal particles on the deposition build-up surface 64. The deposition build-up surface 64 may be either a conventional siftings tray that is comprised as a component of the original equipment underthrow coal distributor 28 or may be a structure that has been added to the underthrow coal distributor 28 (in this latter instance, the structure can be, for example, a siftings tray that has been added or retrofitted to the underthrow coal distributor 28). The deposition control apparatus of the present invention illustrated in FIG. 1 and FIG. 2 comprises a means for influencing the movement of feed material relative to the deposition build-up surface such that the deposition of feed material on the deposition build-up surface is hindered.

In the one embodiment of the deposition control apparatus 40 described in connection with FIG. 1 and FIG. 2, the means for influencing the movement of feed material relative to the deposition build-up surface is in the form of a means for directing a fluid relative to the feed material. This means for directing a fluid relative to the feed material is preferably configured as a pressurized air device 68 operable to inject a stream of air at a predetermined orientation relative to the deposition build-up surface 64 so as to oppose the deposition of coal particles thereon. The pressurized air device 68 includes an outlet nozzle 70, a pressurized air source 72, which may be, for example, a conventional forced air draft fan, and a plenum 74 communicating the outlet nozzle 70 with the pressurized air source 72. The outlet nozzle 70 directs a stream of pressurized air slightly above and parallel to the deposition build-up surface 64, which is illustrated in FIG. 1 and FIG. 2 as a horizontal surface, to thereby promote movement of particles of the coal 24 which are disposed on the deposition build-up surface 64 in the direction toward the drop off location DFL (i.e., in a direction counter to the respective clockwise-handedness direction of movement of the spaced chain 50—namely, in the direction from left to right as viewed in FIG. 2).

It can be understood that the flow characteristics of the stream of pressurized air directed by the outlet nozzle 70—namely, the orientation of the stream of pressurized air relative to the particles of the coal 24 which are disposed on the deposition build-up surface 64, the mass flow rate of the pressurized air, and the continuous application of the stream of pressurized air or, if applied in a pulse manner, the frequency and duration of the pulses—will pre-determine or govern the particle movement capability of the pressurized air device 68. For example, the flow characteristics of the stream of pressurized air directed by the outlet nozzle 70 can be configured such that the stream of pressurized air completely resists any build up of particles of the coal 24 on the deposition build-up surface 64. Alternatively, the flow characteristics of the stream of pressurized air directed by the outlet nozzle 70 can be configured to promote sufficient movement of coal particles such that a deposition build up on the deposition build-up surface 64 occurs but is of a sufficiently limited magnitude as to not interfere with the operation of the endless conveyor 42. Moreover, the stream of pressurized air directed by the outlet nozzle 70 can be continuously or intermittently operated or can be operated at a relatively lower mass flow rate for a predetermined interval during which a deposition build up may occur until reaching an unacceptable extent and then operated at a relatively higher mass flow rate for a subsequent interval to reduce or completely eliminate the deposition build up on the deposition build-up surface 64.

Figure 3:
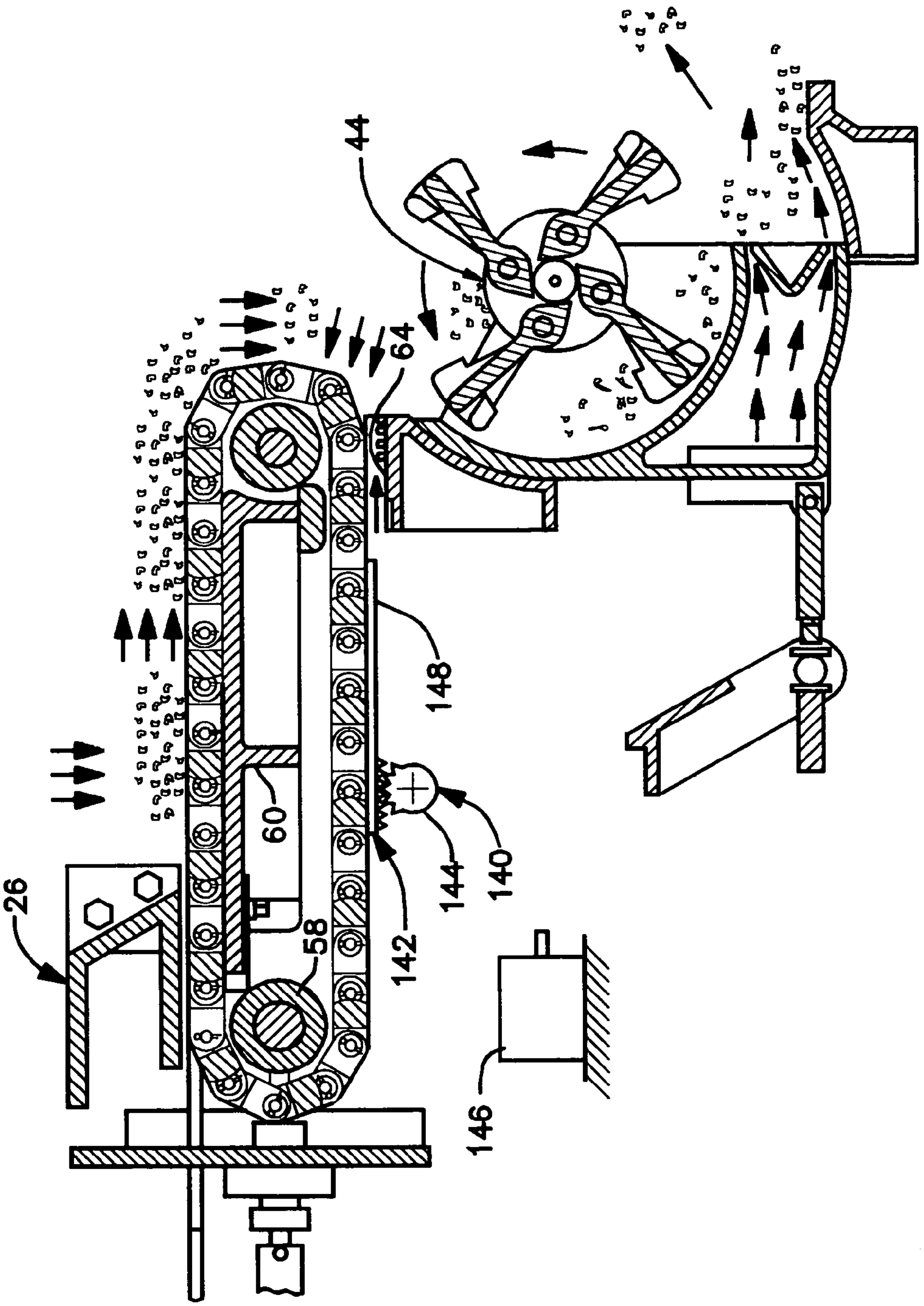
FIG. 3 is an enlarged sectional elevational view of the underthrow coal distributor shown in FIG. 1 having another embodiment of the deposition control apparatus of the present invention.

Reference is now had to FIG. 3, which is an enlarged sectional elevational view of the underthrow coal distributor 28 shown in FIG. 1 having, in lieu of the one embodiment of the deposition control apparatus of the present invention shown in FIG. 2, another embodiment of the deposition control apparatus of the present invention, hereinafter designated as the deposition control apparatus 140. The deposition controlling apparatus 140 is in the form of a mechanical device for displacing feed material and comprises a rack 142 meshingly engaged by a pinion gear 144 that is rotatingly driven by a step motor 146. The rack 142 includes a projecting end 148 that is selectively extendable along a path slightly above and parallel to the deposition build-up surface 64 and retractable in a reverse direction by corresponding clockwise- and counter-clockwise rotation of the pinion gear 144. The projecting end 148 of the rack 142, during its extension movement, pushes particles of the coal 24 which are disposed on the deposition build-up surface 64 in the direction toward the drop off location DFL and against the respective clockwise-handedness direction of movement of the spaced chain 50—i.e., in the direction from left to right as viewed in FIG. 3.

Since the invention is susceptible to various modifications and alternative forms, it should be understood that the invention is not intended to be limited to the particular forms disclosed. Rather, the scope of the invention extends to all modifications, equivalents and alternatives falling within the spirit and scope of the invention as defined by the appended claims.

What is claimed is:

1. In a feeder arrangement having an endless conveyor for conveying feed material to a distribution rotor having rotating blades for further conveyance of the feed material wherein the endless conveyor moves in a loop having a respective clockwise-denominated handedness with some portion of the endless conveyor always traveling along an upper run while another portion of the endless conveyor travels along a lower run below the upper run and the endless conveyor, as the endless conveyor travels along the upper run of the endless conveyor, conveying said feed material to a drop-off location at which said feed material drops off the endless conveyor for receipt thereof by the rotating blades of the distribution rotor, the improvement comprising:

a deposition build-up surface disposed immediately below the beginning of the lower run of the endless conveyor and so as to extend in parallel relation to the path of movement of the lower run of the endless conveyor;

the distribution rotor being rotatable in an opposite clockwise-denominated handedness relative to the endless conveyor so as to thereby cause a portion of the feed material conveyed by the endless conveyor to move towards the deposition build-up surface; and an apparatus for controlling the deposition of feed material on the deposition build-up surface that is subjected to deposition loading of conveyed feed material that has exited the endless conveyer but yet has not been conveyed beyond the distribution rotor, the apparatus for controlling the deposition of feed material on the deposition build-up surface comprising means for influencing the movement of feed material relative to the deposition build-up surface such that the deposition on the deposition build-up surface of feed material conveyed by the endless conveyer is impeded thereby whereby control is thus effected over the deposition on the deposition build-up surface of feed material conveyed by the endless conveyor.

2. In a feeder arrangement having an endless conveyor for conveying feed material to a distribution rotor having rotating blades for further conveyance of the feed material conveyed by the endless conveyor, the improvement in accordance with claim 1 wherein the means for influencing the movement of the feed material conveyed by the endless conveyor relative to the deposition build-up surface includes means for directing a fluid relative to the feed material conveyed on the endless conveyor that has been deposited on the deposition build-up surface.

3. In a feeder arrangement having an endless conveyor for conveying feed material to a distribution rotor having rotating blades for further conveyance of the feed material conveyed by the endless conveyor, the improvement in accordance with claim 2 wherein the means for directing a fluid relative to the feed material conveyed on the endless conveyor that has been deposited on the deposition build-up surface includes a pressurized air device that is operable to inject a stream of air at a predetermined orientation relative to the deposition build-up surface so as to oppose the deposition on the deposition build-up surface of feed material conveyed on the endless conveyor.

4. In a feeder arrangement having an endless conveyor for conveying feed material to a distribution rotor having rotating blades for further conveyance of the feed material conveyed by the endless conveyor, the improvement in accordance with claim 1 wherein the means for influencing the movement of the feed material conveyed by the endless conveyor relative to the deposition build-up surface includes a mechanical device for displacing the feed material conveyed by the endless conveyor that has been deposited on the deposition build-up surface.

* * * * *